United States Patent [19]

Sigl

[11] Patent Number: 5,246,280
[45] Date of Patent: Sep. 21, 1993

[54] BRAKE SYSTEM HAVING TRACTION AND ANTILOCK CONTROL

[75] Inventor: Alfred Sigl, Sersheim, Fed. Rep. of Germany

[73] Assignee: Robert Bosch GmbH, Stuttgart, Fed. Rep. of Germany

[21] Appl. No.: 760,793

[22] Filed: Sep. 16, 1991

[30] Foreign Application Priority Data

Oct. 18, 1990 [DE] Fed. Rep. of Germany ....... 4033024

[51] Int. Cl.$^5$ .......................... B60T 8/32; B60T 8/48
[52] U.S. Cl. ............................. 303/113.2; 303/116.1; 303/119.1; 303/DIG. 4
[58] Field of Search ........ 303/113 R, 113 TR, 116 R, 303/116 SP, 119 R, 119 SU, DIG. 1-DIG. 6, 113.1, 113.2, 116.1, 116.2, 119.1, 119.2

[56] References Cited

U.S. PATENT DOCUMENTS

| | | | |
|---|---|---|---|
| 4,687,260 | 8/1987 | Matsui et al. | 303/116 R |
| 4,796,959 | 1/1989 | Seibert et al. | 303/113 TR |
| 4,807,944 | 2/1989 | Weise | 303/DIG. 3 X |
| 4,861,116 | 8/1989 | Bernhardt et al. | 303/113 TR X |
| 4,861,118 | 8/1989 | Burckhardt et al. | 303/113 TR |
| 5,039,176 | 8/1991 | Hellmann et al. | 303/116 R X |
| 5,058,961 | 10/1991 | Hergenthaler et al. | 303/116 R X |
| 5,076,647 | 12/1991 | Grana et al. | 303/116 R X |

FOREIGN PATENT DOCUMENTS

| | | |
|---|---|---|
| 3127301 | 1/1983 | Fed. Rep. of Germany . |
| 3633341 | 4/1988 | Fed. Rep. of Germany . |
| 2109882 | 6/1983 | United Kingdom . |

Primary Examiner—Robert J. Oberleitner
Assistant Examiner—Peter M. Poon
Attorney, Agent, or Firm—Edwin E. Greigg; Ronald E. Greigg

[57] ABSTRACT

A brake system having a master brake cylinder that can be acted upon by fluid pressure of a brake pedal and which communicates with wheel brake cylinders via brake lines, a reversing valve that is closable for traction control and pressure holding and pressure reduction valves for anti-lock control are incorporated into at least one brake line to the wheel brake cylinder. Traction control is effected via a return pump that is connected on the inlet side to at least one brake line. The hydraulic circuit is intended to have a reservoir, which communicates on the inlet side with a self-aspirating return pump via an intermediate line with the brake line via a pressure limiting valve, where the pressure limiting valve has at least one blocking position and an open position on both ends.

14 Claims, 9 Drawing Sheets

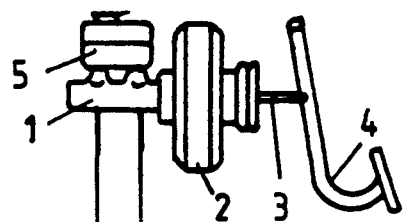
Fig. 2
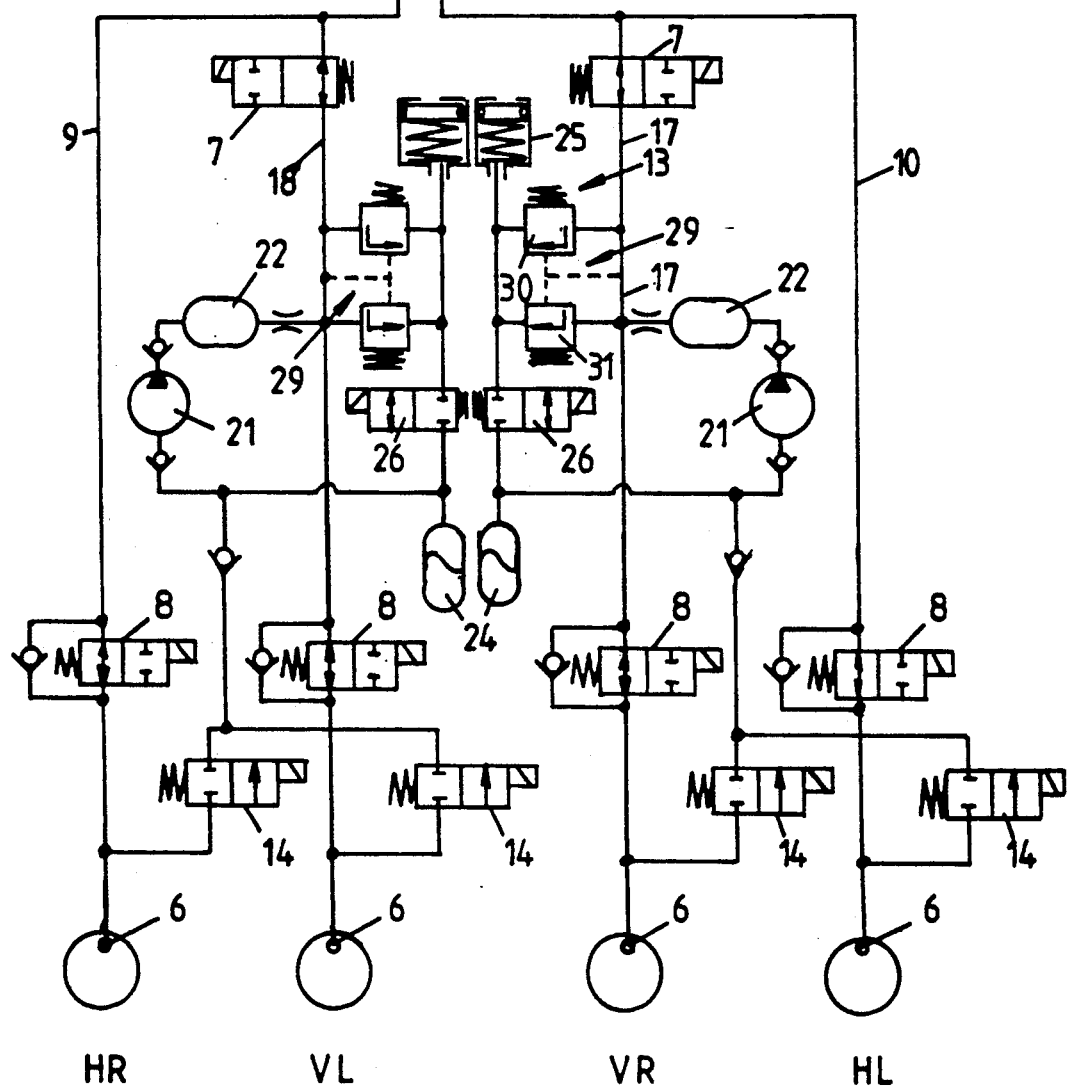
HR　　VL　　VR　　HL

BRAKE SYSTEM HAVING TRACTION AND ANTILOCK CONTROL

BACKGROUND OF THE INVENTION

The present invention relates to a brake system as defined hereinafter.

Many versions of such brake systems are known. This is true above all for the combination of antilock control and traction control. In the present case, the anti-lock control and traction control are substantially carried by suitable pressure holding and pressure reduction valves, while the pressure build-up for the traction control takes place by means of a feed pump. In the known versions, a considerable effort in designing and engineering, with many individual elements, is necessary for this purpose, and attendant upon this is the danger of failure and leakage. Other cases again do not involve a closed hydraulic concept, because the feeding of pressure fluid for traction control takes place from separate reservoirs, for instance. For the sake of orientation, reference is made to German Offenlegungsschrift 31 27 301 and German Offenlegungsschrift 36 33 341.

OBJECT AND SUMMARY OF THE INVENTION

The present invention has the particular advantage that the expense for individual elements is minimized. In the first exemplary embodiment, a self-aspirating return pump draws the appropriate pressure fluid for traction control from a reservoir that is independent from the known reservoirs for holding pressure fluid after an anti-skid control operation. This fluid that has been drawn then is fed back into the brake line for traction control by the return pump. If in this process a threshold value for a pressure of the pressure limiting valve is exceeded, then this valve switch is open, so that pressure fluid returns to the reservoir. This produces a closed hydraulic concept, which enables fast braking intervention.

The aforementioned reservoir, from which the return pump draws pressure fluid, is preferably embodied as a piston reservoir. The piston can slide freely in a corresponding chamber. Since the return pump is embodied as self-aspirating, it draws the necessary pressure fluid from the reservoir on its own. Then as soon as the pressure from the wheel brake cylinders is reduced, this pressure fluid returns on its own to the reservoir.

Preferably, however, the piston should also be acted upon by a spring, which keeps the piston in a position of repose counter to the suction force of the return pump. It suffices for this spring to bring to bear a force equivalent to approximately 0.2 bar upon the piston.

Not until the return pump exceeds this pressure does it aspirate corresponding pressure fluid from the reservoir, which gives up approximately 3 cm³ of fluid volume.

The above-described valve should also have one blocking position and an open position on both ends. In normal braking operation, it is in the blocking position, but in traction control it switches over to the open position. Since at the same time the return pump is switched on, this pump can aspirate the appropriate pressure fluid from the reservoir via the valve.

In a particularly preferred exemplary embodiment of the invention, a further pressure limiting valve is incorporated parallel to the pressure limiting valve between the brake line or branch line in the intermediate line. This pressure limiting valve is embodied such that it is open at relatively low pressure, while it switches to the blocking position at approximately 5 bar. This pressure limiting valve serves above all to assure that the reservoir always has sufficient pressure fluid for pre-charging of the return pump. It is known that the reservoir loses volume, particularly when the traction control is shut off, but also by other leakage. This volume can be aspirated by the reservoir via the aforementioned pressure-limiting valve, even when braking is not occurring, or in other words when no pressure or hardly any pressure prevails in the brake line. This is a substantial advantage of the present invention. Preferably, both pressure limiting valves are combined into one valve body; an exemplary embodiment will be described in detail in conjunction with the drawing. However, the invention should not be limited to this.

In another exemplary embodiment of the invention, the aforementioned pressure limiting valve is replaced with a magnet valve, which is closed during normal braking operation but can be switched into the open position. After a braking event ends, both this valve and the valve between the reservoir and the return pump are triggered and opened briefly, so that the pressure piston reservoir can be filled, and the reservoir possibly still filled from a return from traction control can be evacuated.

In another exemplary embodiment, the last described valve can have an open position in normal operation as well, while it is switched into a blocking position in traction control. This assures that the pressure piston reservoir will be filled in any case during normal braking operation.

In these last two exemplary embodiments, a pressure limiting valve is also provided in a bypass around the reversing valve. This pressure limiting valve serves as a safety valve, for instance if the intermediate reservoir for the return in traction control was not yet completely empty at the onset of traction control.

It is also provided within the scope of the invention that between the return pump and the reversing valve an additional reservoir can feed additional pressure fluid into the brake line. A charging valve is associated with this additional reservoir and is controlled as a function of a pressure switch. It is normally in the blocking position.

However, if the pressure switch senses an overly low pressure level, then the charging valve opens, so that additional pressure fluid can flow into the brake line.

Filling of the additional reservoir is effected via the return pump; the charging valve and the other valves are then triggered accordingly. During braking operation, the charging valve must naturally not be triggered.

In another preferred exemplary embodiment of the invention, it is intended that the reversing valve be replaced with a plunger in the brake line. This assures an extraordinarily fast braking intervention in traction control. Preferably this plunger comprises a cylinder in which a dividing piston is located between two pressure chambers. The brake line toward the wheel brake cylinder adjoins one pressure chamber. Leading into the other pressure chamber, contrarily, is a pressure line by way of which the pressure chamber can be acted upon with pressure by means of a charge pump. This charge pump is a so-called fast-charging pump, which by action upon the dividing piston generates a pressure of approximately 15 bar in the wheel brake cylinders within approximately 100 ms.

An ensuing pressure reduction is effected via a relief valve, which is incorporated parallel to the pump between the reservoir for pressure fluid and the pressure chamber. The charge pump itself should preferably have both a pressure limiting valve in a bypass and a corresponding check valve associated with it.

In normal braking, a passage from the pressure chamber adjoining the brake line to the wheel brake cylinder forms in the plunger, leading through an axial bore in the dividing piston and corresponding radial bores and an annular chamber around the dividing piston, into which annular chamber the brake line from the master brake cylinder discharges.

In the present case, the concept is accordingly one of a closed traction control with fast braking intervention. There is no impairment of the activity of the master brake cylinder. The concept is intended for both a TT-type brake circuit distribution, in accordance with DIN 74 000, and for a brake circuit distribution that can be called a K-type, in which the various elements are as a rule each present twice. Brake circuit distributions of these kinds are also known as "diagonally split brake circuits" and "front-to-rear split circuits". The existing basic system for traction control needs to be modified only slightly for this purpose, however.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is a block circuit-like view of a brake system of the K-type according to the invention;

DESCRIPTION OF THE PREFERRED EMBODIMENTS

Figure 1:
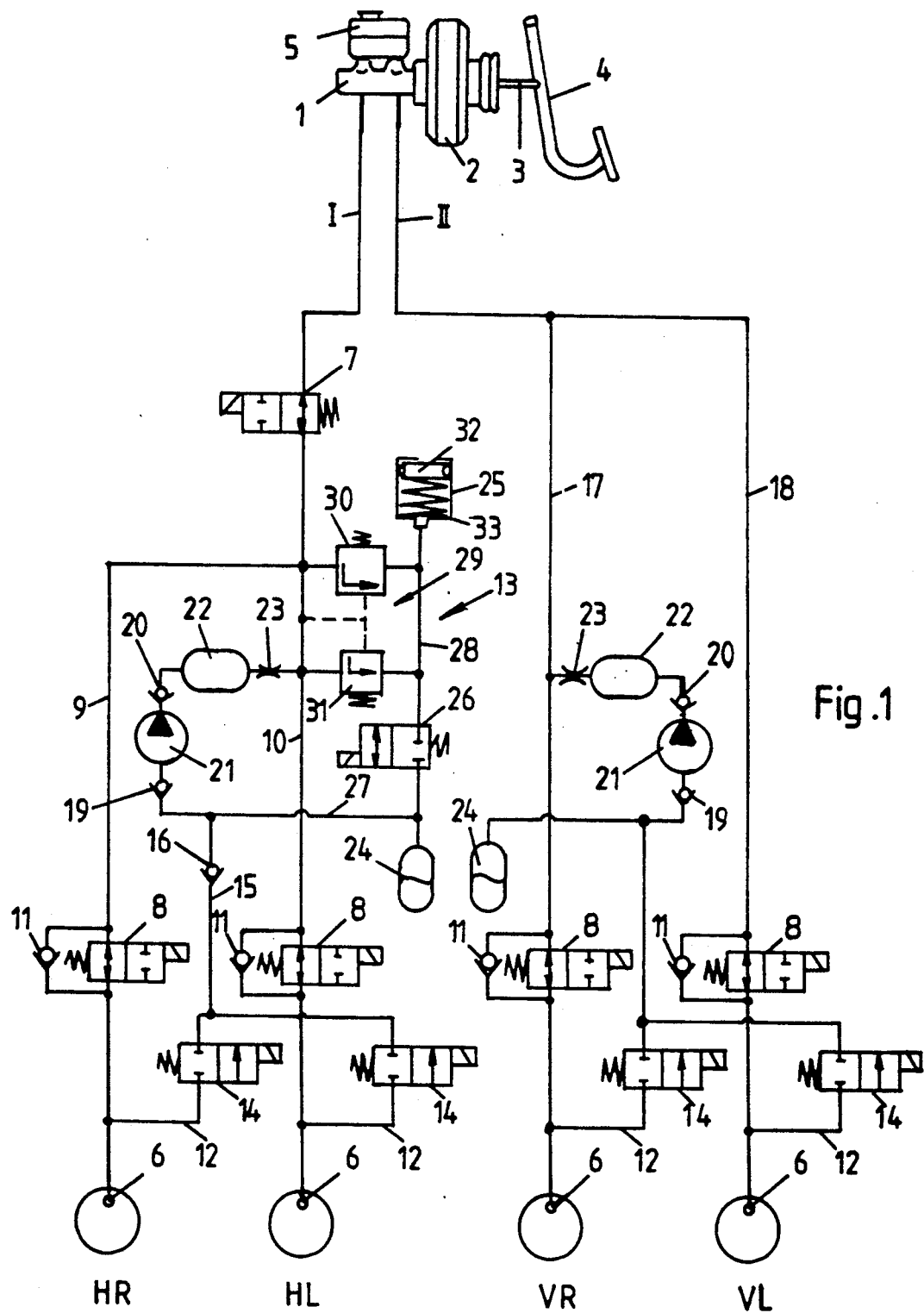
FIG. 1 is a block circuit-like view of a brake system of the TT-type according to the invention.

A brake system according to the invention, as shown in FIG. 1, has a master brake cylinder 1 with a brake booster 2 associated with it; the brake booster can be acted upon by a piston rod 3, which occurs when pressure is exerted upon a brake pedal 4.

A reservoir 5 for brake fluid is mounted on the master brake cylinder 1. Under the influence of a brake pressure from the master brake cylinder 1 or corresponding brake chambers, not shown in further detail, this brake fluid reaches the various brake lines I and II.

Brake line I leads to wheel brake cylinders 6 of a right and left rear wheel HR and HL, while brake line II connects the master brake cylinder 1 with wheel brake cylinders 6 of a right and left front wheel VR and VL.

A reversing valve 7, which has an open position and a blocking position, is incorporated into the brake line I downstream of the master brake cylinder 1. The brake line I divides downstream of the reversing valve 7 into a branch line 9 and a branch line 10; each branch line 9 and 10, respectively, lead to one wheel brake cylinder 6 of the right and left rear wheel, respectively. A pressure holding valve 8 for a traction control operation, to be described later, is also incorporated into each branch line 9 and 10, and each pressure holding valve 8 likewise has one open and one blocking position. A bypass having a one-way check valve 11 is also associated with each pressure holding valve 8.

Between each pressure holding valve 8 and wheel brake cylinder 6, a respective diversion line 12 branches off to return brake fluid from the wheel brake cylinder 6 into a hydraulic circuit 13, and each hydraulic circuit 13 is preceded by pressure reduction valves 14. Each pressure reduction valve 14 has a blocking position and an open position toward the hydraulic circuit 13. For the sake of simplicity, the diversion lines 12 of each wheel brake cylinder 6 unite again after the respective pressure reduction valve 14; a one-way check valve 16 having a blocking position counter to the hydraulic circuit 13 is then inserted into the united line 15.

The brake line II also divides into the branch lines 17 and 18, but lacks the reversing valve. For traction control, however, corresponding pressure holding valves 8 with check valves 11 associated with them and corresponding pressure reduction valves 14 in diversion lines 12 are provided.

A self-aspirating return pump 21 follows the check valve 16 of the brake circuit for the rear wheels, or directly follows the pressure reduction valves 14 of the front wheels, bracketed by two oneway check valves 19 and 20; by way of this pump, pressure fluid can be pumped downstream of the check valve 20 into a reservoir 22. Downstream of a throttling segment 23, this reservoir 22 again communicates with the respective branch line 10 and 17.

A reservoir 24 in each brake circuit is also provided to hold the brake fluid returned from the wheel brake cylinders 6 via the diversion line 12.

The hydraulic circuit 13 has a reservoir 25, which communicates via a control valve 26 with the return pump 21 The valve 26 has a blocking position and an open position in both directions. The aforementioned reservoir 24 also discharges into the connecting line 27 downstream of the valve 26 but upstream of the return pump 21 or its preceding check valve 19.

An intermediate line 28 between the reservoir 25 and the valve 26 communicates with the branch line 10 to the left rear wheel HL via a hydraulic valve 29. The hydraulic valve 29 is composed of two pressure limiting valves 30 and 31, which are designed such that the pressure limiting valve 30 switches open beyond a pressure in the branch line 10 of approximately 80 bar, while the pressure limiting valve 31 switches open at a pressure of up to 5 bar and blocks beyond approximately 5 bar.

In the present exemplary embodiment, the reservoir 25 is also embodied as a piston reservoir; a corresponding piston 32 is supported against a spring 33. By means of the spring 33, the piston 32 is pressed into its position of repose by the equivalent of approximately 0.2 bar. If the self-aspirating return pump 21 produces a greater negative pressure, then the reservoir gives up approximately 3 cm³ of volume.

The mode of operation of this brake system is as follows:

In a normal braking event, both the reversing valve 7 and the pressure holding valves 8 are switched to the open position, so that braking fluid pressure is applied to the wheel brake cylinders in the various wheels equally.

If a sensor, not shown in further detail, on one of the wheels should ascertain a loss of traction, then the self-aspirating return pump 21 is started up; the reversing valve 7 is switched to the blocking position, and the valve 26 is switched to the open position. While the return pump 21 in brake line I cannot draw any pressure fluid from the reservoir 24, the return pump does draw pressure fluid from the reservoir 25 and feeds it into the branch line 10 of brake line I. Since both the branch line 10 and the branch line 17 communicate with the corresponding branch lines 9 and 18 of the other wheels, brake fluid can in any event reach the wheel brake cylinder 6 at which a loss of traction was detected.

As a result of the rising pressure in the branch line 10, the pressure limiting valve 31 closes as soon as the pressure rises above 5 bar. Thus this communication with the intermediate line 28 is also interrupted, so that traction control can readily ensue. This traction control then takes place in a working pressure range between 5 and 80 bar. Not until this pressure is exceeded does the pressure limiting valve 30 open to allow pressure to be reduced again by returning to the reservoir 25. The actual traction control is effected by means of the pressure holding valves 8 and pressure reduction valves 14 in accordance with an anti-lock control operation.

Once the loss of traction has been eliminated, which is detected by the aforementioned wheel sensors, the return pump is first shut off, and the corresponding pressure holding valve 8 and the pressure reduction valve 14 are triggered. Via the latter valve, the brake fluid then returns from the wheel brake cylinder 6 to the connecting line 27, the intermediate line 28, and the reservoir 25. After a period of approximately 500 ms, the valve 26 and the pressure holding valve 8 and pressure reduction valves 14 then switch over to being inactive; that is, both the valve 26 and the pressure reduction valves 14 enter the blocking position, while the pressure holding valve 8 is opened. After a further period of approximately 50 ms, the reversing valve 7 is switched over as well, so that the passage to the master brake cylinder 1 is opened.

If the shutoff process is initiated by an incipient braking, then this period is shortened to approximately 200 ms.

In the event of an anti-lock control operation, the valve 26 is not triggered. The anti-lock control takes place exclusively via the pressure holding valves 8 and the pressure reduction valves 14, and returned brake fluid can reach the reservoir 24.

Upon each shutoff event after the traction control, some volume is lost from the reservoir 25 to the brake line I. This lost volume is reaspirated by the reservoir 25 via the pressure limiting valve 31, which does not switch to the blocking position until after 5 bar, while no brake pressure is built up in brake line I.

The embodiment of the brake system shown in FIG. 2 with K-type distribution differs from that of FIG. 1 only in that a hydraulic circuit 13, comprising a reservoir 25, hydraulic valve 29, and valve 26, is associated with brake line II. Also, the various branch lines 17 and 18 for the left and right front wheels are occupied by the reversing valves 7. The hydraulic circuits 13 are also associated with these branch lines 17 and 18. There are neither a hydraulic circuit 13 nor a reversing valve 7 in the branch lines 9 and 10 to the right and left rear wheels. The mode of operation of the brake system is equivalent of FIG. 1.

Figure 3:
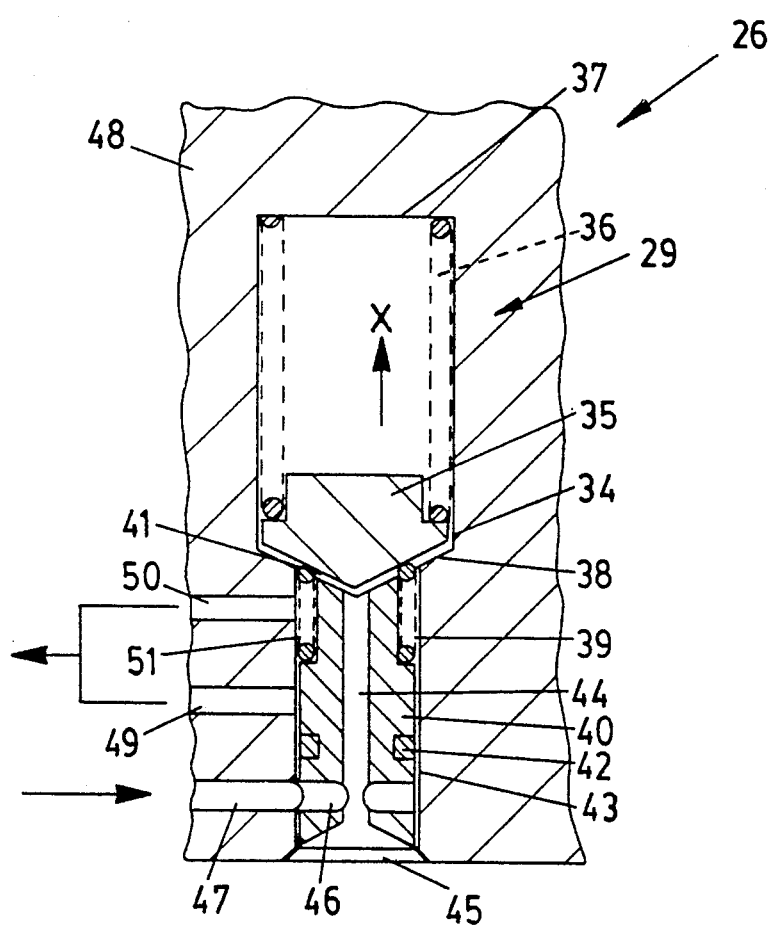
FIG. 3 is a cross section through a hydraulic valve according to the invention.

An exemplary embodiment of a hydraulic valve 29 is shown in FIG. 3. A piston 35 is located in a stepped bore 34 and is supported via a spring 36 against a bottom 37 of the stepped bore 34. Downstream of a shoulder-like offset 38, a sliding piston 40 is kept spaced apart from the piston 35 via a further spring 39. This spacing forms an admission slit 41 between the piston 35 and the sliding piston 40.

The sliding piston 40 is supported via a ring seal 42 against a cylinder wall 43 in which the sliding piston 40 is supported. The sliding piston 40 is also penetrated by an axial bore 44, which communicates on one end with the admission slit 41 and on the other with an inlet 45 for pressure fluid, for example with the branch line 10. A further communication exists with a further inlet 47, via radial bores 46.

Two outlets 49 and 50 are also provided in a valve body 48.

The mode of operation of this valve 26 is as follows:
The spring 39 is pre-stressed so that it counteracts a pressure on the slide piston 40 of approximately 5 bar. Up to this pressure limit, the admission slit 41 is maintained and opens up a path from the branch line 10 via the axial bore 44, the admission slit 41, an annular chamber 51 containing the spring 39, and the outlet 50. This outlet 50 then discharges into the intermediate line 28, so that the reservoir 25 can refill with brake fluid from the branch line 10.

If the pressure in the branch line 10 increases so that a higher pressure also prevails at the inlet 45, then the slide piston 40 is displaced in the direction toward the piston 35 and closes the admission slit 41. This closes the pressure limiting valve 31.

The spring 36, in turn, is embodied such that it yields only at a higher pressure, so that the piston 35 is not displaced until then. Thus if a pressure of 80 bar, for instance, in the branch line 10 prevails at the inlet 45 or the inlet 47, then the slide piston 40 and the piston 35 are displaced in the X direction, so that the radial bore 46 finally coincides with the outlet 49. Pressure fluid can now reach the intermediate line 28 through the axial bore 44 via the inlet 45 or 47 and through the outlet 49, so that the branch line 10 is relieved.

In the following exemplary embodiments of brake systems, the corresponding elements are provided with the same reference numerals as in FIGS. 1 and 2, so that they need not be described below. Accordingly, only the differences will be described in greater detail.

Figure 4:
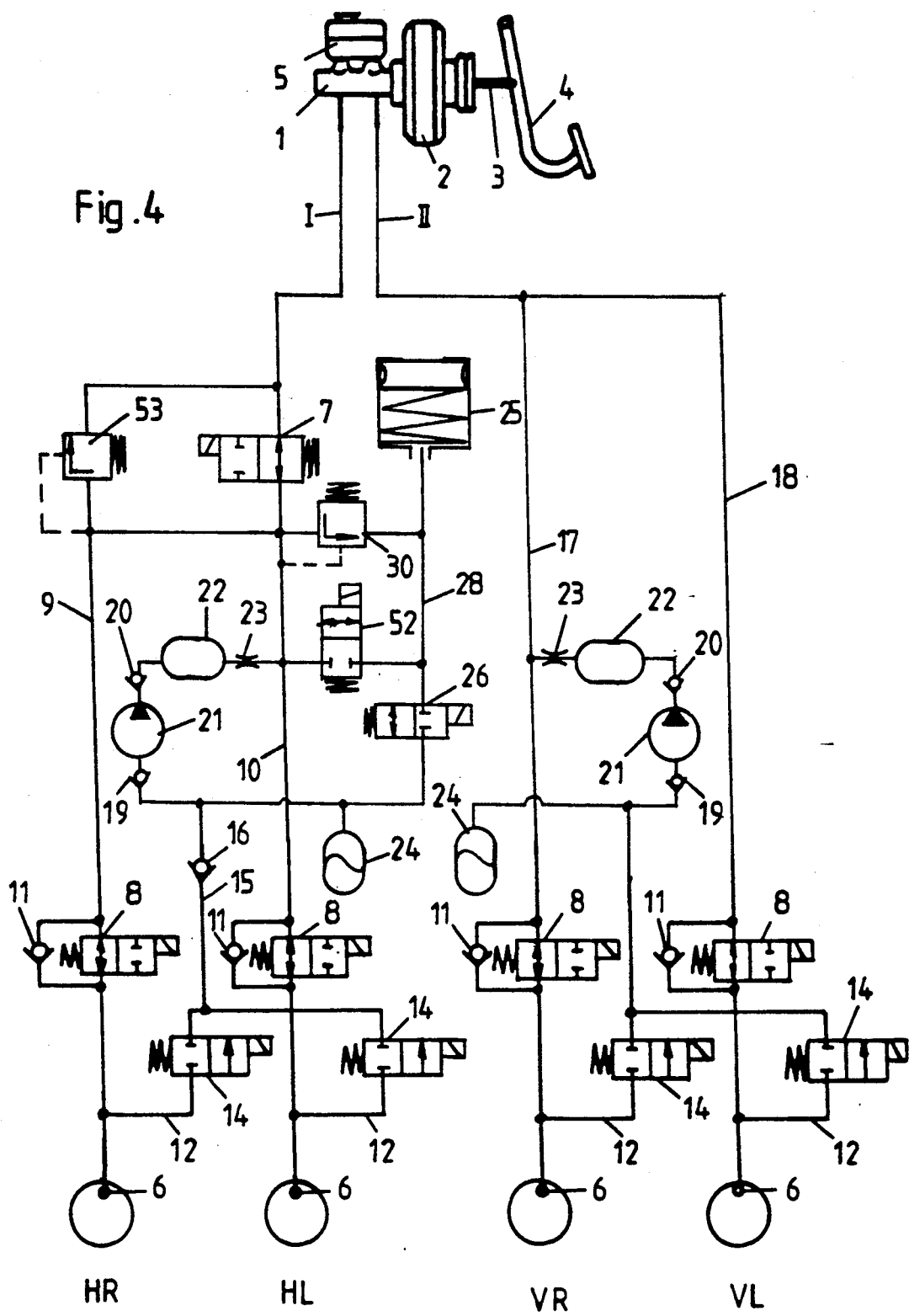

In FIG. 4, instead of the hydraulic valve 29, the pressure limiting valve 30 is provided separately, and an additional magnet valve 52 is also incorporated between the branch line 10 and the intermediate line 28. To a certain extent, this magnet valve 52 takes over the task of the pressure limiting valve 31 described in conjunction with FIGS. 1 and 2. As mentioned above, some volume is lost from the reservoir 25 in the direction of brake line I in the shutoff process of the traction control. If this loss is ascertained, then the magnet valve 52 can be briefly switched open, so that the reservoir 25 can re-aspirate a corresponding amount of pressure fluid.

In the present exemplary embodiment, a further pressure limiting valve 53 is also incorporated into the branch line 9, adjoining the brake line I upstream of the reversing valve 7 and both branch lines 9 and 10 downstream of the reversing valve 7. This pressure limiting valve 53 has an opening pressure that is approximately 100 bar higher than that of the pressure limiting valve 30. It thus acts as a safety valve, for instance if the reservoirs 24 were not empty at the onset of traction control. It is also provided after the end of a braking event and also of an anti-lock control operation, that both the valve 26 and the magnet valve 52 are briefly triggered and opened, so that any reservoir 24 that may still be filled can be evacuated.

Figure 5:
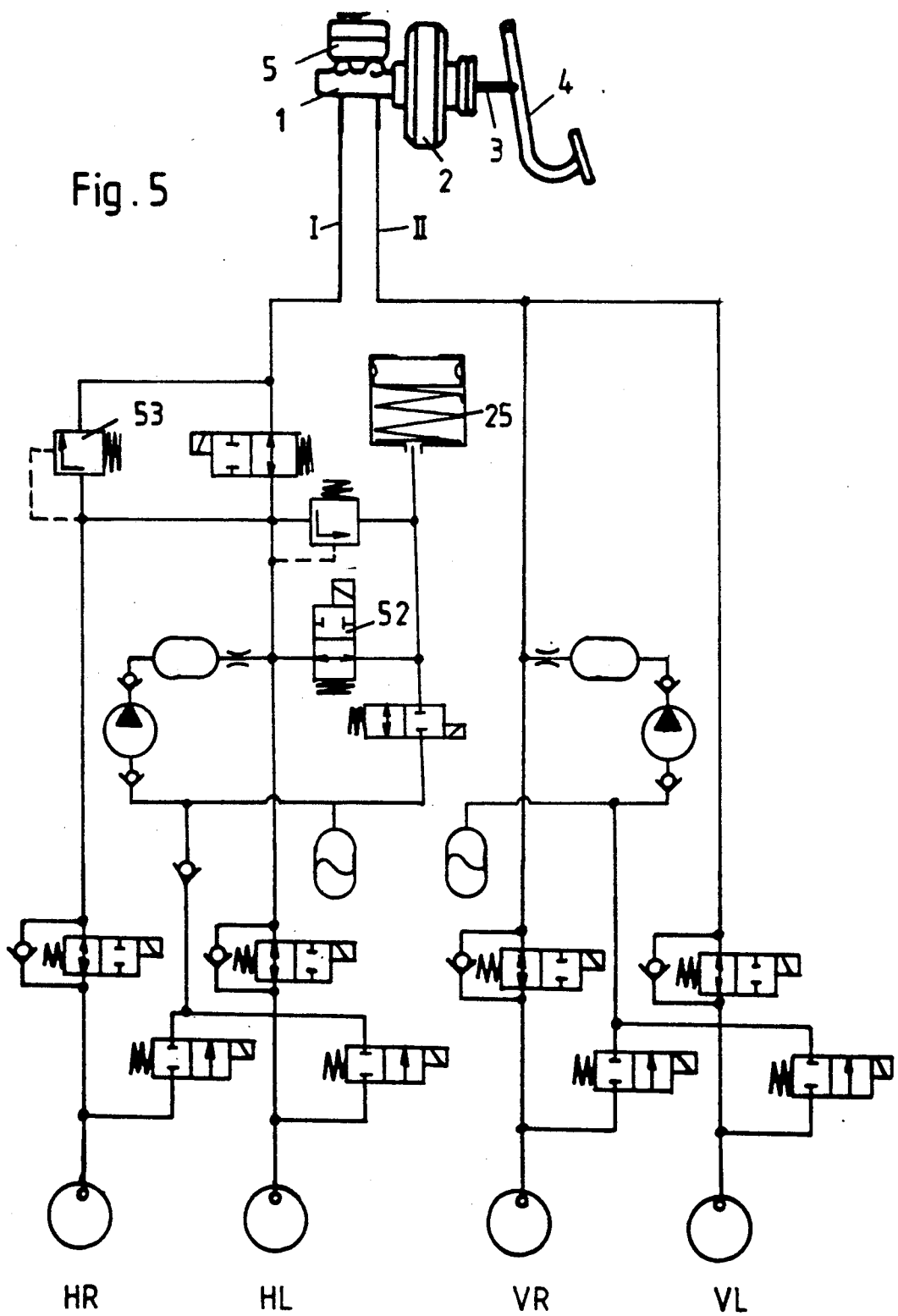
FIG. 5 is a block circuit-like view of a further exemplary embodiment according to the invention of a brake system of FIG. 4.

The exemplary embodiment of FIG. 4 differs from the exemplary embodiment of FIG. 5 in that the valve 26 and the magnet valve 52 in the inactive state are switched for blocking operation, while in the exemplary embodiment of FIG. 5, the magnet valve 52 is in the open position. Although this has the advantage that the reservoir 25 can be refilled without switching a valve when the brake is not actuated, leakage to the outside from the reservoir 25 can still cause a circuit failure, because brake fluid is then lost via the magnet valve 52 and the reservoir 25.

Figure 6:
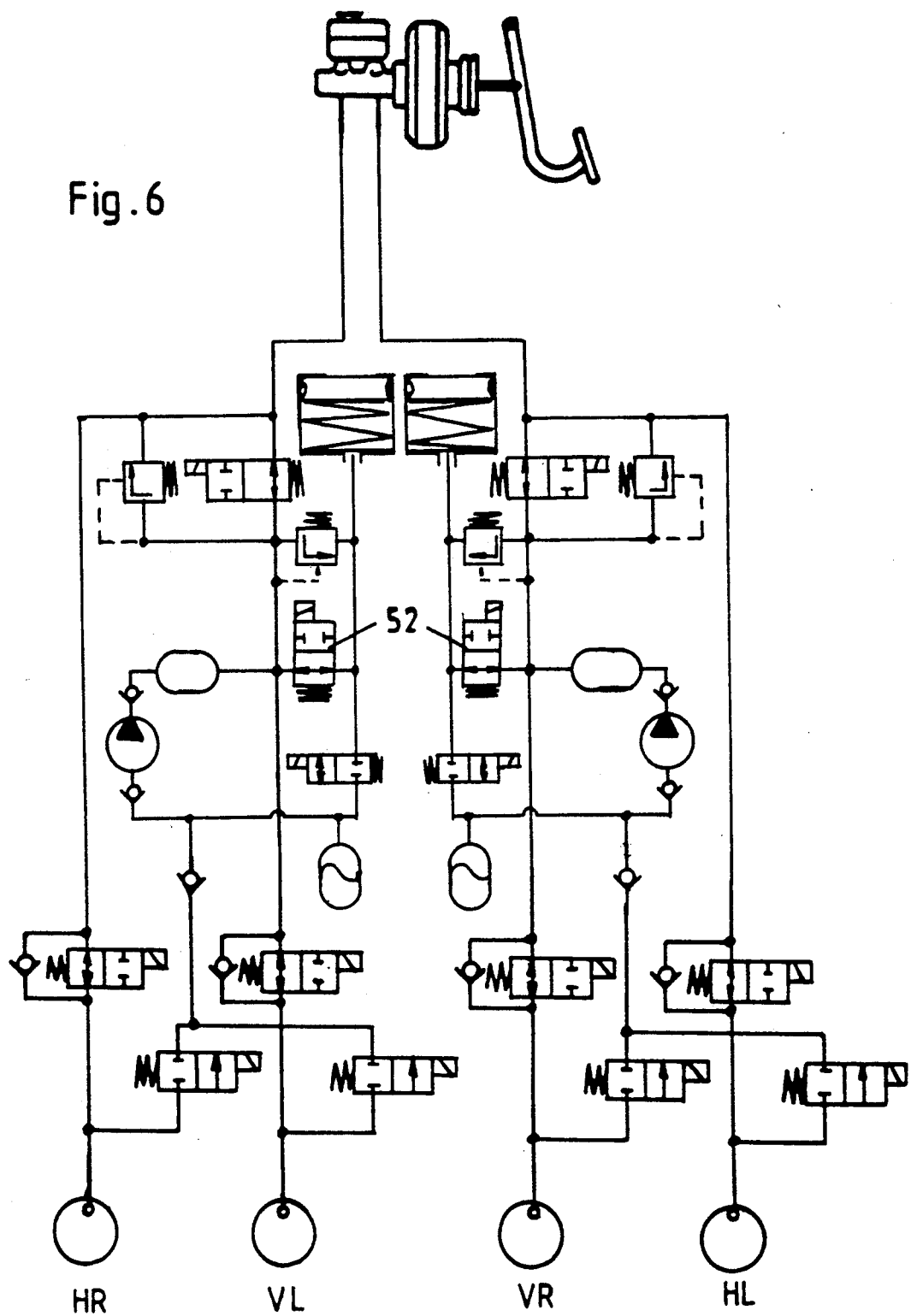
FIG. 6 is a block circuit-like view of a further exemplary embodiment according to the invention of a brake system of FIG. 5 of the K-type.

The embodiment of the invention shown in FIG. 6 includes two magnet valves 52, which are equivalent to that of FIG. 5. Otherwise, the function and mode of operation of this brake system is the same as that described above, except that a K-type distribution is involved here.

Figure 7:
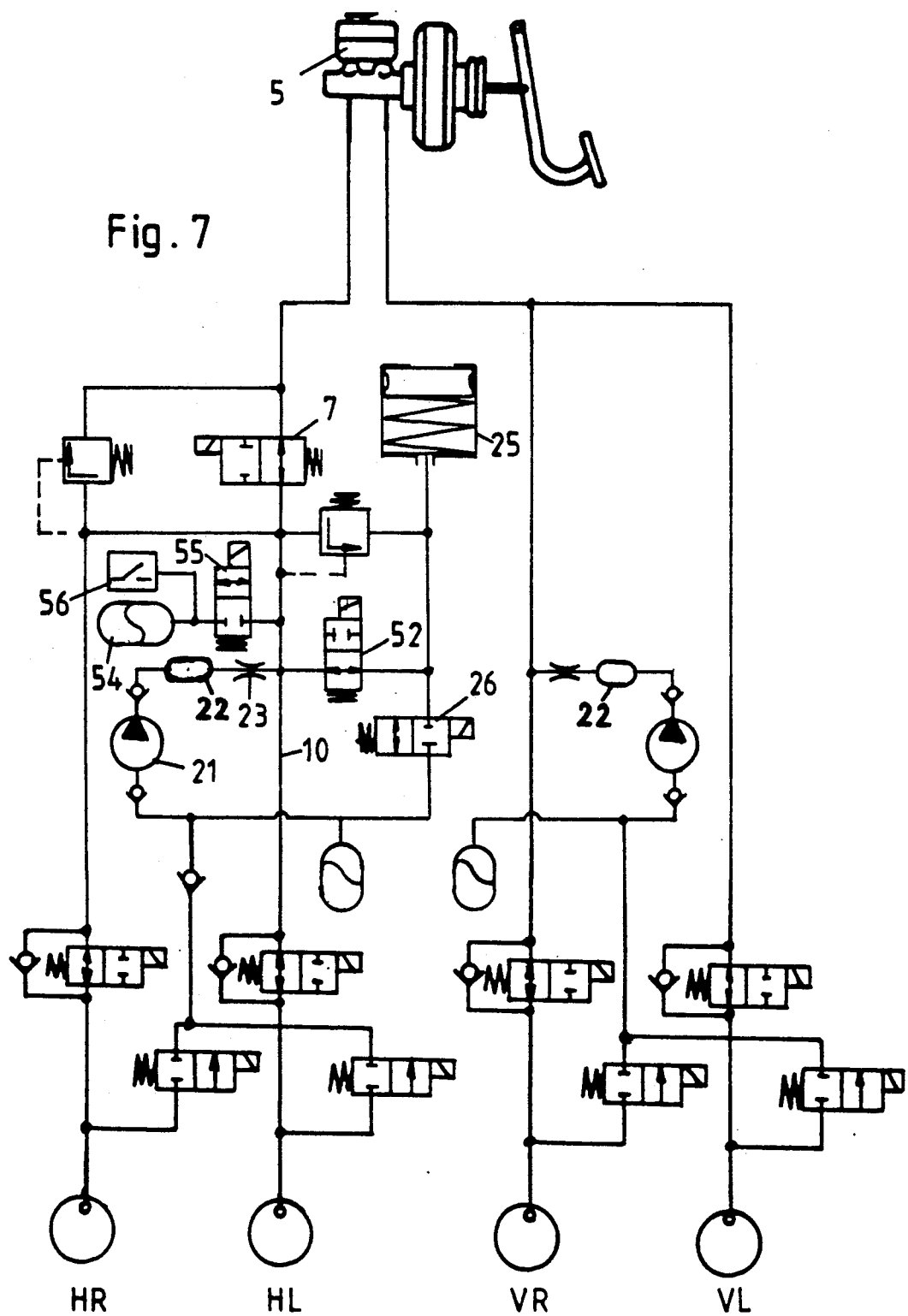
FIG. 7 is a block circuit-like view of a further exemplary embodiment according to the invention of a brake system of a TT-type.

In the exemplary embodiment of the invention shown in FIG. 7, a separate reservoir 54 is connected to the branch line 10. The control of the reservoir 54 is taken over by a charging valve 55 having one blocking position and an open position on both ends. Triggering is effected via a pressure switch 56 for the reservoir charging process, or during traction control for fast feeding of pressure fluid into the branch line 10 During braking operation, the charging valve 55 must naturally not be triggered, because otherwise a pressure drop would occur in the branch line 10. If the pressure switch 56 senses an overly low pressure level, the reservoir 54 can be recharged at some time when braking is not occurring, which is done by triggering the charging valve 55, the reversing valve 7, the magnet valve 52 and the valve 26. The self-aspirating return pump 21 is also put into operation and fluid is thus retrieved from the reservoir 25. After the shutoff of the charging process, this reservoir can be resupplied with pressure fluid from the branch line or from the reservoir 5 via the magnet valve 52.

Figure 8:
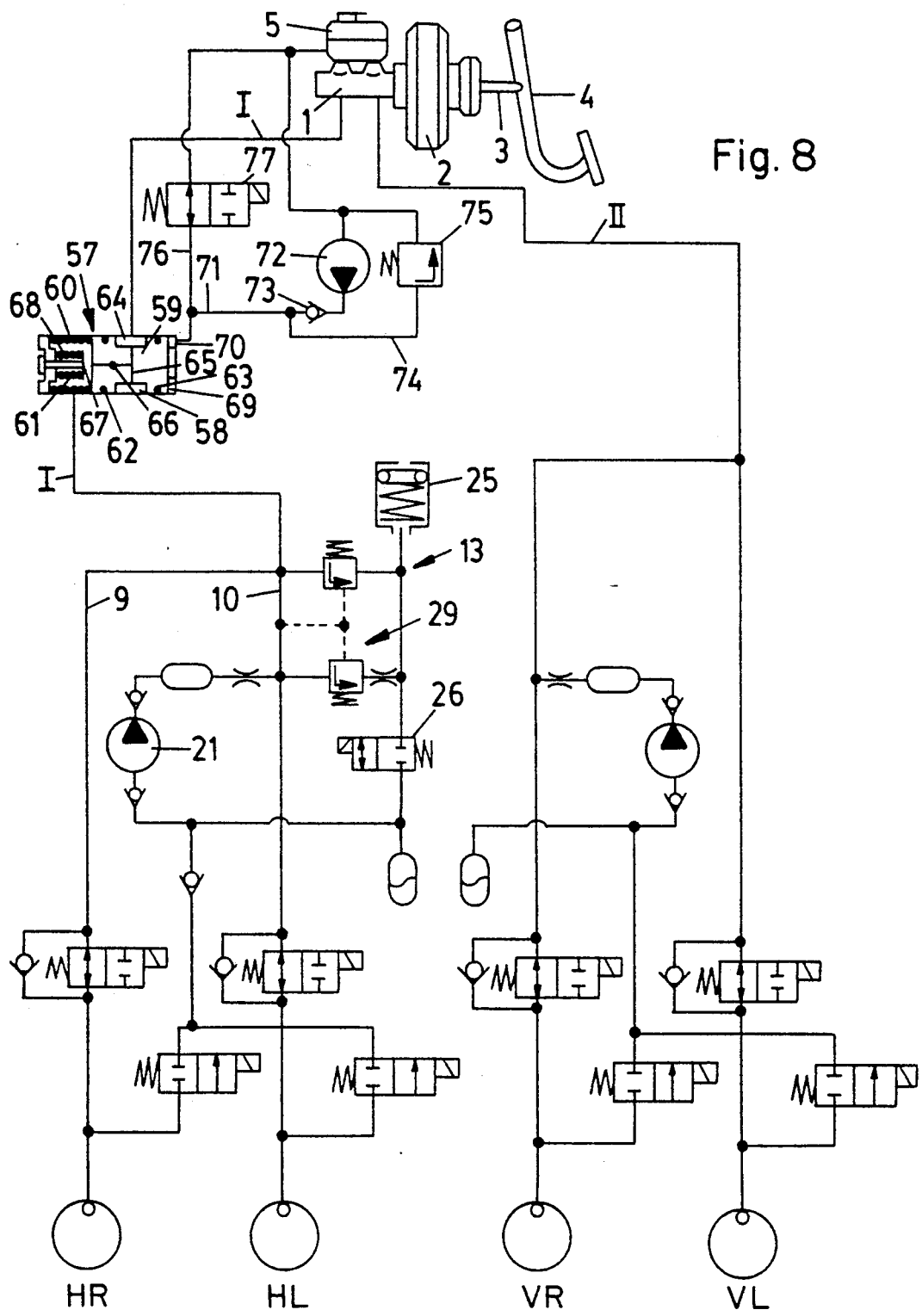
FIG. 8 is a block circuit-like view of a further exemplary embodiment according to the invention of a brake system of a TT-type.

In the exemplary embodiment of a brake system of FIG. 8, a plunger 57 is incorporated into the brake line I, instead of the reversing valve 7. This plunger 57 is shown only schematically. In a corresponding cylinder 58, a divider piston 59 is retained in the outset position shown by the pressure of a spring 60. The spring 60 rests in a pressure chamber 61, from which part of the brake line I emerges before it splits into the branch lines 9 and 10. Between two ring seals 62 and 63, there is an annular chamber 64 into which the brake line I from the master brake cylinder 1 discharges. This annular chamber 64 communicates via suitable radial and axial bores 65 and 66, respectively, with the pressure chamber 61. The axial bore 66 discharges into the pressure chamber 61 in such a way that upon displacement of the divider piston 59 it meets a valve seat 67 and is thereby closed. This valve seat 67 is likewise displaceable counter to the force of the spring 68.

On the other side of the pressure chamber 61, the divider piston 59, with a bottom 69, forms a further pressure chamber 70 into which a pressure line 71 discharges. Via this pressure line 71, brake fluid can be admitted from the reservoir 5 into the pressure chamber 70 by means of a charging pump 72, via a check valve 73.

A suitable pressure limiting valve 75 is provided in a bypass 74 around the charging pump 72.

A return line 76 to the reservoir 5 also adjoins the pressure line 71, and a relief valve 77 having one open and one blocking position is incorporated into this return line 76.

If traction control arises, then via the charging pump 72 and via the divider piston 59, a pressure at the drive wheels of approximately 15 bar is intended to be generated within approximately 100 ms. A pumping capacity of the charging pump of 20 cm$^3$/s should suffice, on the assumption that the brake calipers take up a volume of approximately 2 cm$^3$ at 15 bar. The ensuing pressure buildup then takes place, as described in conjunction with FIG. 1, via the return pump 21 with the hydraulic circuit 13.

The relief valve 77 parallel to the charging pump 72 assures a rapid return of the divider piston 59 at the end of traction control. During the traction control, however, this valve 77 is in the blocked position.

As a result of the additional check valve 73, the charging pump 72 can be shut off again after the displacement of the divider piston 59, despite the fact that traction control continues. This means that the charging pump 72 needs to be switched on only for approximately 0.5 seconds at the beginning of traction control.

The additional pressure limiting valve 75 serves as a safety valve and may optionally be jointly included in the function of the relief valve 77.

Figure 9:
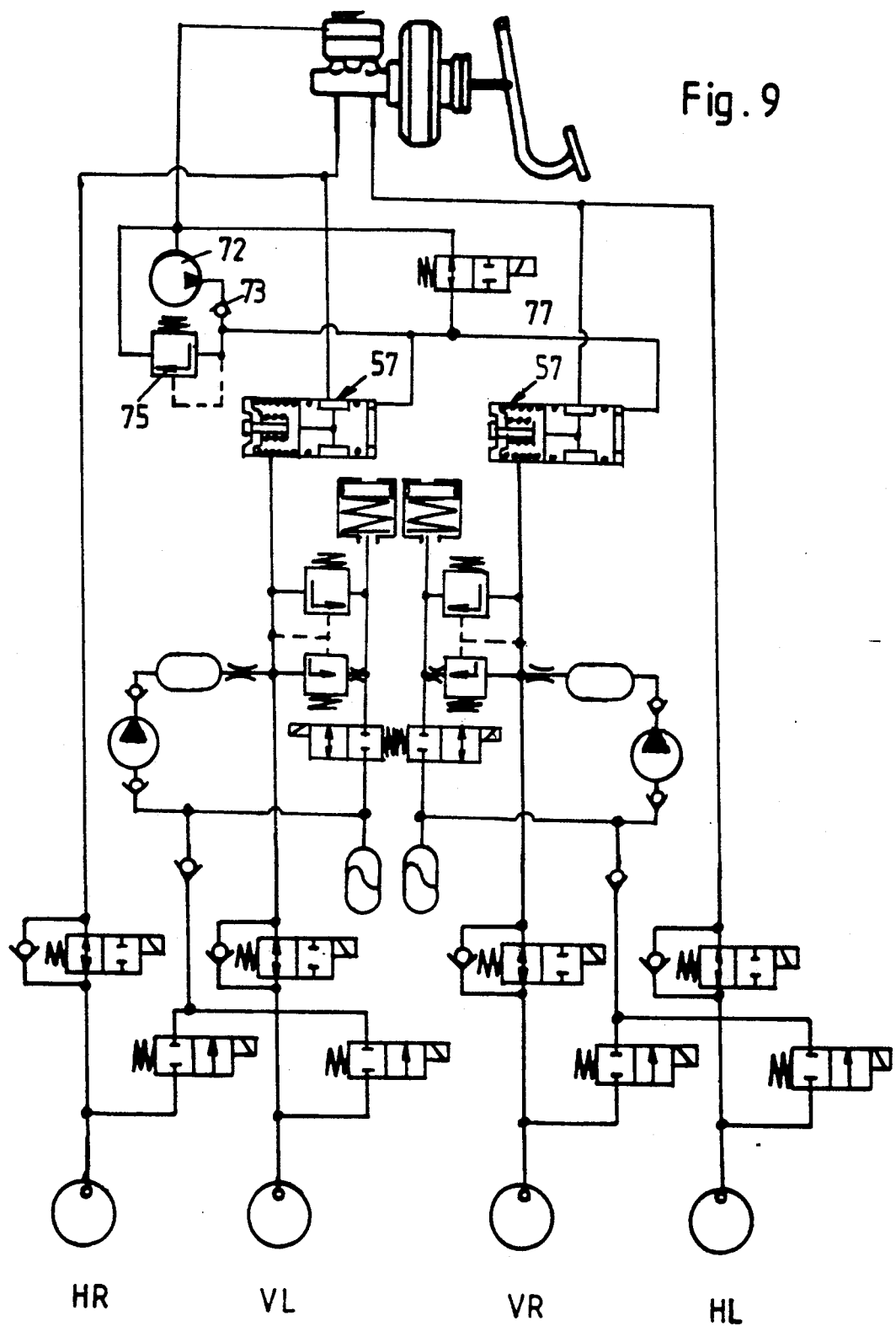
FIG. 9 is a block circuit-like view of a further exemplary embodiment according to the invention of a brake system of the K-type.

In the exemplary embodiment of the brake system with K-type distribution as shown in FIG. 9, two plungers 57 are correspondingly provided, but only one charging pump 72 is provided to impose pressure upon these plungers 57. Accordingly, one check valve 73, one pressure limiting valve 75 and one relief valve 77 are also sufficient. Otherwise, this brake system is equivalent to that of FIG. 2.

In a further exemplary embodiment, not shown in further detail, the reservoir 25 of FIG. 1 may also be embodied without a restoring spring. Upon shutoff of the traction control, after the self-aspirating return pump 21 is shut off, only the reversing valve 7, the valve 26 and pressure reduction valve 14 are triggered, for approximately 500 ms. After that, the valve 26 and the pressure reduction valve 14 are then switched off approximately 50 ms before the reversing valve 7. Filling of the reservoir 25 is effected by relieving the wheel brake cylinders 6 via the pressure reduction valve 14 and via the pressure limiting valve 31, which is open at a pressure of up to 5 bar in the branch line 10. This is a simpler hydraulic version.

The same is naturally also feasible with a K-type distribution.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake system having a master brake cylinder which is acted upon by a brake pedal and which communicates with wheel brake cylinders via brake lines, at least one brake line to the wheel brake cylinders includes a reversing valve (7) that is closable for traction control, and a pressure holding value (8), and a pressure reduction valve (14) for anti-lock control and traction control is connected with a self aspirating return pump, said self aspirating return pump is connected on an inlet side to a return line downstream of the pressure reduction valve (14) and to a hydraulic circuit on an outlet side and is connected to at least one brake line, said hydraulic circuit (13) includes a reservoir (25) which is hermetically sealed fluid tight against the atmosphere and which communicates on an inlet side with said self-aspirating return pump (21) via an intermediate line (28), with an incorporated control valve (26) and also with the at least one brake line (I, II) via a first pressure limiting valve (30), where the incorporated control valve (26) has at least one blocking position which is a normal position and an open position on both ends, and said incorporated control valve (26) is switched to said open position for traction control.

2. A brake system as defined by claim 1, in which the reservoir (25) is a piston reservoir having a piston (32).

3. A brake system as defined by claim 2, in which a spring (33) guides the piston (32) into a position of repose upon the aspiration of brake fluid from the brake line (I) via a second pressure limiting valve (31).

4. A brake system as defined by claim 3, in which a second pressure limiting valve (31), which switches into its blocking position upon the attainment of a relatively low pressure, of 5 bar is incorporated parallel to the first pressure limiting valve (30) between the brake line (I, II) and the intermediate line (28).

5. A brake system as defined by claim 4, in which the first and second pressure limiting valves (30) and (31) are combined in one valve body (48).

6. A brake system as defined by claim 3, in which the first pressure limiting valve (30) switches over to an open position at approximately 80 bar.

7. A brake system as defined by claim 2, in which a second pressure limiting valve (31), which switches into its blocking position upon the attainment of a relatively low pressure, of 5 bar is incorporated parallel to the first pressure limiting valve (30) between the brake line (I, II) and the intermediate line (28).

8. A brake system as defined by claim 7, in which the first and second pressure limiting valves (30) and (31) are combined in one valve body (48).

9. A brake system as defined by claim 2, in which the first pressure limiting valve (30) switches over to an open position at approximately 80 bar.

10. A brake system as defined by claim 1, in which a second pressure limiting valve (31), which switches into its blocking position upon the attainment of a relatively low pressure, of 5 bar is incorporated parallel to the first pressure limiting valve (30) between the brake line (I, II) and the intermediate line (28).

11. A brake system as defined by claim 10, in which the first pressure limiting valve (30) switches over to an open position at approximately 80 bar.

12. A brake system as defined by claim 11, in which the first and second pressure limiting valves (30) and (31) are combined in one valve body (48).

13. A brake system as defined by claim 10, in which the first and second pressure limiting valves (30) and (31) are combined in one valve body (48).

14. A brake system as defined by claim 1, in which the first pressure limiting valve (30) switches over to an open position at approximately 80 bar.

* * * * *